Dec. 8, 1953 T. E. POLIAKOFF 2,662,111

FOLDED SCHMIDT TELEVISION PROJECTOR WITH COLOR DISK

Filed Feb. 27, 1951

INVENTOR.
THEODORE E. POLIAKOFF
BY [signature]
AGENT.

Patented Dec. 8, 1953

2,662,111

UNITED STATES PATENT OFFICE 2,662,111

FOLDED SCHMIDT TELEVISION PROJECTOR WITH COLOR DISK

Theodore E. Poliakoff, New York, N. Y., assignor to Philips Laboratories, Inc., Irvington-on-Hudson, N. Y.

Application February 27, 1951, Serial No. 212,889

1 Claim. (Cl. 178—5.4)

This invention relates generally to field sequential color television systems, and more particularly to receivers in such systems adapted for the reception of color television images and which utilize a movable color element in conjunction with a cathode ray tube to effect such reception.

Known field-sequential color television receivers of the so-called direct view type have certain inherent disadvantages. Since the movable element must be inserted in the image path set up between the cathode ray tube and the viewing screen in or near a plane in which the image is in focus, and since the element must have an area considerably larger than the area of the cathode ray tube face, space and construction requirements undesirably limit the size of the image appearing on the viewing screen. For example, in the event a C.-R. tube is employed having a screen with a 12 inch diameter, at least a 25 inch diameter color wheel would be required. In addition, since the aforesaid color wheel must be rotated at a constant speed whose magnitude is determined by the type of wheel used, said speed being independent of the wheel area, an increase in the element area will increase the peripheral speed of the wheel, thus increasing the noise of operation. A further drawback is that high peripheral speeds are hazardous because the color wheel may disintegrate and fly apart. Furthermore, if said receivers are selectively to receive black and white images also, means must be provided for shifting said wheel out of the image path when such reception is desired. This is quite difficult with known methods. It is evident therefore that serious limitations exist in direct-view systems with respect to large screen images.

Moreover conventional types of color wheels or drums require the use of a special cathode ray tube whose phosphors have a rapid rate of decay. In consequence, should such conventional color elements in conjunction with the requisite special tube be employed in an optical projection system for enlarged reproduction, the net result will be unsatisfactory in that the rapid-decay cathode ray tube would give rise to objectionable flicker unless its light intensity is kept low, in which case, the illumination on the viewing screen would be inadequate.

In view of the foregoing, the primary object of this invention is to provide an efficient, simple and economical projection type color television system affording a large scale color television image free from the above set forth disadvantages.

More specifically it is an object of this invention to provide a projection type color television system wherein the dimensions of the requisite color elements is relatively small with respect to the dimensions of the viewing screen.

Yet another object of the invention is to provide in a system of the above type an improved color wheel, making possible the use of a cathode ray tube whose phosphors possess a relatively slow decay characteristic.

Briefly stated, these objects are attained by the use of a folded Schmidt optical system which magnifies the image appearing on a small-face cathode ray tube and projects said magnified image upon a viewing screen, a movable color element being introduced into the optical system whereby it is disposed in the image path immediately in front of said tube. Also provided is a motor for rotating said element and means to shift said element out of said path whereby the same system may be utilized for black and white reception as well as color. In order to synchronize the color wheel in the receiver with that at the transmitter, means are provided coupled to the motor frame for this purpose.

For a better understanding of the invention as well as other objects and further features thereof, reference is made to the following detailed description of the invention to be read in conjunction with the attached drawing, wherein.

The present invention is directed to improvements in a color television system of the type in which the fields are sequentially scanned in three primary colors. A full and detailed disclosure of the general theory underlying the basic system may be found in the patent to Goldmark No. 2,480,571 issued August 30, 1949.

Figure 1:
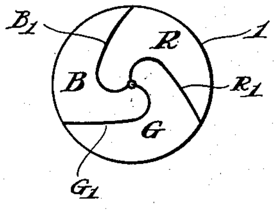
Figure 1 is a perspective view of the movable color element.

Referring now to Figure 1 it will be seen that the movable color element is constituted by a circular disc 1 which is divided into three equal transparent segments G, R and B each segment having a different primary color. The curved segment boundaries $G_1$, $B_1$ and $R_1$ have characteristic shapes to enable each segment to scan the entire cathode ray tube image. It is important to note that in systems presently in use six or more segments are used. By using a three sector system of the type herein disclosed and rotating said three sector element at a speed which is a multiple of the speed used in the six sector discs, it is now possible to use a cathode ray tube whose face is built up of phosphors with a substantially slower rate of decay than used heretofore, thus reducing flicker and permitting use of a tube with substantially greater light intensity such tubes being preferable in a projection type system.

Figure 2:
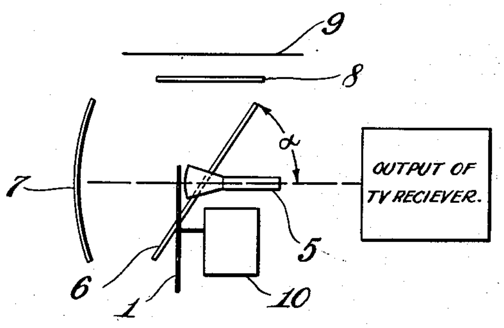
Figure 2 illustrates schematically a preferred embodiment of a projection type color television reception system in accordance with the invention.

Referring now to Fig. 2 which shows the complete color reception system, there is provided a field-sequential television receiver of the type disclosed in said Goldmark patent, the output of the receiver being applied to a C.-R. tube contained in a Schmidt optical system of the type generally disclosed in the patent to P. M. Van Alphen 2,476,124 issued July 12, 1948.

Cathode ray tube 5 is mounted in the opening of a concave mirror 6. Light rays emitted from the tube are passed through the disc and are projected upon a concave spherical mirror 7 whose optical axis coincides with the optical axis of the tube. The light rays striking mirror 7 are reflected back upon mirror 6, which is mounted at an angle $\alpha$ with respect to said axis, this angle having a value whereby no light is reflected from the mirror 7 onto the concave mirror 6. The light rays projected upon 6 are passed through an aberration correction lens 8 onto the viewing screen 9.

In order to position the color wheel in the closest possible proximity to the focal plane of the Schmidt system, a slit is formed in the mirror 6 of the Schmidt system and the wheel is inserted therein, the position of the slit being such as to place a full segment of the wheel directly in front of the tube face. The element is mounted for movement transversely of the portion of the optical axis extending between the concave spherical mirror 7 and the concave mirror 6. The wheel is rotated by a mechanism 10, more fully disclosed in connection with Fig. 4.

Figure 3:
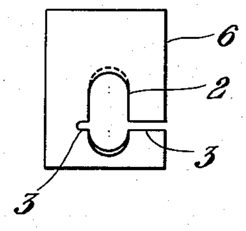
Figure 3 is a plan view of the mirror 6 in Figure 2.

Figure 3 shows a plan view of mirror 6 showing the opening 2 in which the cathode ray tube is inserted and the slit 3 passing through the opening, in which slit the wheel is inserted. One side of slit 3 extends to the mirror edge to permit retraction of the wheel when black and white television reception is desired.

Figure 4:
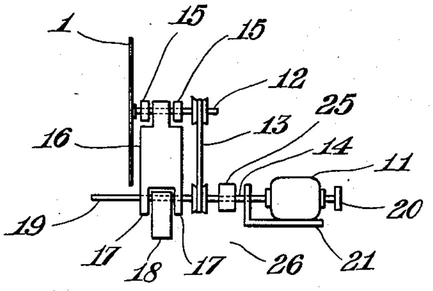
Figure 4 illustrates in detailed form a side elevation of the structure of element 10 in Figure 2.

Figure 4 shows in detail a side elevation view of the apparatus contained in block 10. A motor 11 has an output shaft 14 adapted to rotate within bearings 17 affixed to a base 18. One end of an arm 16 is attached to the base, said end being rigidly connected to a rod 19 perpendicularly mounted thereon. This rod is used to shift the position of disc 1 as shall be shown in Figure 5. Shaft 14 is connected through a belt drive mechanism 13 to shaft 12. Disc 1 is mounted at one end of shaft 12 and rotates therewith, said shaft 12 rotating within bearings 15 mounted in the other end of arm 16. A control knob 20 is rigidly connected to the casing of motor 11. The casing is mounted within bearings contained in supporting plate 21 so that when the control knob is rotated the casing rotates therewith. A braking mechanism 25 is mounted coaxially about shaft 14, said mechanism being responsive to a braking voltage 26 to stop rotation of motor 11 when color wheel synchronization is required.

Figure 5:
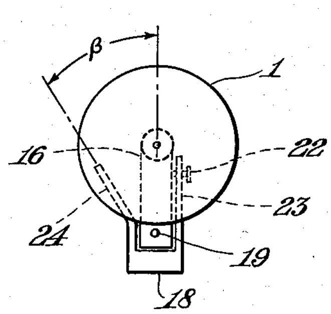
Figure 5 illustrates in detailed form a front elevation of a portion of the structure in Figure 4.

Figure 5 shows in detail a front elevation view of a portion of the apparatus shown in Figure 4. When disc 1 is to be in its position for color television reception rod 19 is turned until arm 16 presses against an adjustment screw 22 mounted in a supporting arm 23 which is rigidly connected to base 18. When disc 1 is to be in its position for black and white television reception, rod 19 is turned until the end of arm 16 not connected to base 18 is turned through an angle $\beta$ so that the arm rests against a supporting arm 24 which is rigidly connected to base 18.

Thus, this invention provides a projection system for field sequential color television reception wherein a small screen cathode ray tube having slow decay phosphors and a small rotating three segment color wheel are used to produce large television images substantially free from flicker. This projection system is readily adaptable for alternate black and white and color television reception, as the color wheel can be readily retracted from the light path of the system.

It is apparent that many changes may be made in the disclosed embodiment by those skilled in the art without departing in spirit or principle from the present invention and the scope thereof should not be considered limited to the embodiments herein disclosed.

What is claimed is:

A color television projection system comprising a cathode-ray tube having a substantially spherical image screen at one end thereof, a concave real image producing spherical mirror substantially concentric with said screen and having its active concave surface facing said screen, the optical axis of said concave mirror intersecting said screen at the central portion thereof, a plane mirror provided with an aperture admitting said cathode-ray tube therethrough and disposed at an angle of substantially 45 degrees with respect to the optical axis of the concave mirror to reflect light rays from said concave mirror to points outside the boundaries of said concave mirror, the screen of said tube being disposed tangentially with respect to the plane of said plane mirror, said plane mirror being further provided with a slit displaced from the central portion thereof, and a rotatable disc-shaped multi-color element having a portion thereof inserted through said slit to occupy a position transversely with respect to said optical axis and closely adjacent the face of said screen.

THEODORE E. POLIAKOFF.

References Cited in the file of this patent

UNITED STATES PATENTS

| Number | Name | Date |
|---|---|---|
| 2,287,307 | Herbst | June 23, 1942 |
| 2,296,019 | Camarena | Sept. 15, 1942 |
| 2,336,134 | Czegho | Dec. 7, 1943 |
| 2,417,621 | Traub | Mar. 8, 1947 |
| 2,454,144 | Epstein | Nov. 16, 1948 |
| 2,476,124 | Van Alphen | July 12, 1949 |
| 2,509,729 | Dome | May 30, 1950 |

OTHER REFERENCES

RCC Docket No. 7896, CBS, identification No. 129 (Pure Color flicker component with long and short persistence phosphors).

Radio and Television News, Dec., 1949, page 38.